United States Patent [19]

Boehm et al.

[11] 3,795,901

[45] Mar. 5, 1974

[54] DATA PROCESSING MEMORY SYSTEM WITH BIDIRECTIONAL DATA BUS

[75] Inventors: Robert Francis Boehm, Wappingers Falls; Donald Wayne Van Bogelen, Poughkeepsie, both of N.Y.

[73] Assignee: International Business Machines Corporation, Armonk, N.Y.

[22] Filed: Dec. 29, 1972

[21] Appl. No.: 319,247

[52] U.S. Cl. .............................................. 340/172.5
[51] Int. Cl. .............................................. G06f 13/00
[58] Field of Search .................................. 340/172.5

[56] References Cited

UNITED STATES PATENTS

| | | | |
|---|---|---|---|
| 3,488,634 | 1/1970 | Mager | 340/172.5 |
| 3,562,716 | 2/1971 | Fontaine et al. | 340/172.5 |
| 3,587,044 | 6/1971 | Jenkins | 340/172.5 |
| 3,421,149 | 1/1969 | Kretzmer et al. | 340/172.5 |
| 2,991,456 | 7/1961 | Evans | 340/172.5 |
| 3,235,664 | 2/1966 | Muroga et al. | 340/172.5 |

*Primary Examiner*—Gareth D. Shaw
*Assistant Examiner*—Paul R. Woods
*Attorney, Agent, or Firm*—Martin G. Reiffin

[57] ABSTRACT

A digital computer memory system having a bidirectional data bus for transmitting information in both directions between the memory unit and a central processing unit associated with the memory system. The system includes a bidirectional latch unit for maintaining on the data bus the integrity of the information previously transmitted to the memory unit during a WRITE operation so that the central processing unit may check the stored information for errors.

1 Claim, 2 Drawing Figures

DATA PROCESSING MEMORY SYSTEM WITH BIDIRECTIONAL DATA BUS

BACKGROUND OF THE INVENTION

1. Field of the Invention

This invention relates to digital computer memory systems and other data processing systems having a bidirectional data bus for transmitting data, instructions, and other information in both directions between a first unit, such as the memory, and a second unit, such as a central processing unit. The invention further relates to a novel bidirectional latch unit for use in said systems.

2. Description of the Prior Art

There are many important advantages in the use of a single bidirectional data bus for transmitting data and other information between two or more units of a digital computer or other data processing system: First, because of restraints imposed by the limited number of input-output connections, the single bidirectional bus arrangement permits the storage of a larger number of information bits on a single memory card, thereby saving space and the expense of extra cards. Second, half as many data buses are required, thereby saving expense and providing greater reliability. Third, the frame size of the memory may be reduced by about one-half, thereby permitting the memory to be combined with the central processing unit as a single unit. Fourth, this arrangement results in half the number of transmitter and receiver circuits at opposite ends of the data bus; instead of two transmitters and two receivers for each bit line of the bus, it is only necessary to provide two circuits each of which both transmits and receives. Fifth, only half the number of control circuits (data-in and data-out gates) are required.

Notwithstanding the above and other important advantages of a single bidirectional data bus, and the suggestion of such an arrangement in U.S. Pat. No. 3,594,736, the bidirectional data bus has not heretofore been generally employed in digital computers and other data processing systems. It is believed that the bidirectional data bus was not adopted, notwithstanding its numerous important advantages noted above, because of the following disadvantages which are inherent in the arrangement disclosed in said U.S. Pat. No. 3,594,736: First, during the WRITE operation the information to be stored in the memory must be maintained by the central processing unit on the data bus for the substantial time period until the information is actually stored in the selected memory cells, thereby tying up the central processing unit for this substantial time period and slowing down its speed of operation. Second, during the READ operation the information to be transmitted from the memory to the central processing unit must be maintained on the data bus by the memory for a substantial time period until the central processing unit is prepared to accept the information, thereby tying up the memory unit for this time period and substantially slowing down its speed of operation.

SUMMARY OF THE INVENTION

It is therefore a primary object of the present invention to provide a novel data processing system embodying a bidirectional data bus with all of the advantages and none of the disadvantages discussed above.

Another object of the present invention is to provide in such a system a novel bidirectional latch unit having means for maintaining on the data bus the integrity of the information transmitted to the memory during a WRITE operation, whereby the central processing unit may check the stored information for errors.

Other objects and advantages of the present invention are inherent in the structure and mode of operation disclosed and/or will be apparent to those skilled in the art as the detailed description proceeds.

DESCRIPTION OF THE PREFERRED EMBODIMENT

Figures 1, 2:
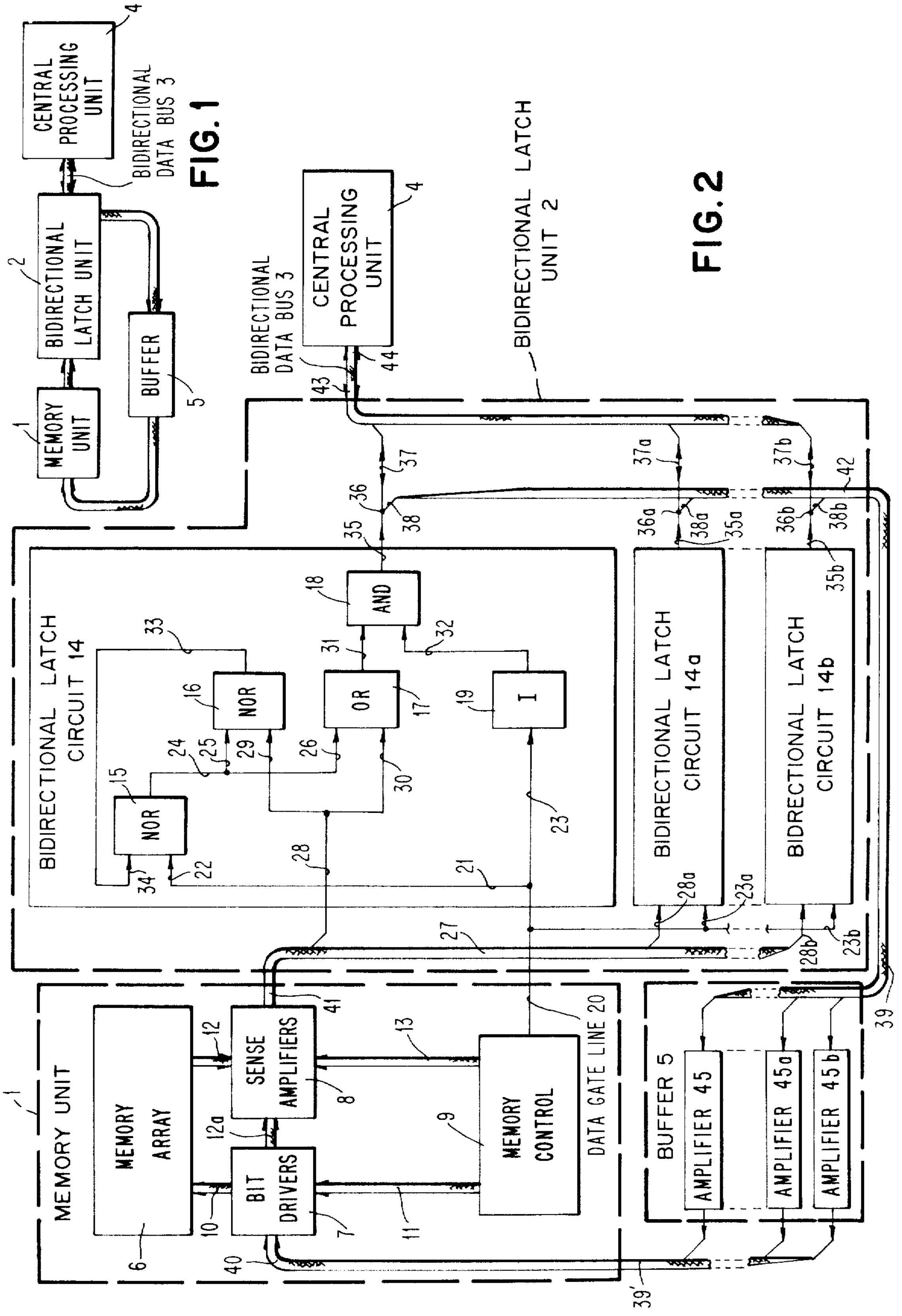
FIG. 1 is a block diagram showing a preferred embodiment of the invention in the form of a digital memory computer system.
FIG. 2 is similar to FIG. 1 and shows further details, including the components of the memory unit and the logic blocks of the bidirectional latch circuits constituting the bidirectional latch unit.

Referring first to FIG. 1, there is shown a preferred embodiment of the invention in the form of a digital computer memory system comprising a memory unit 1 having an output connected to the input of a bidirectional latch unit 2 connected by a bidirectional data bus 3 to a central processing unit 4. The output of bidirectional latch unit 2 and the corresponding end of bidirectional data bus 3 are connected through buffer 5 to the input of memory unit 1.

Referring now to FIG. 2, memory unit 1 comprises a memory array 6, a set of bit drivers 7, a set of sense amplifiers 8, and a memory control 9. Bit drivers 7 transmit information to memory array 6 through cable 10 in accordance with control signals received from memory control 9 through cable 11. Sense amplifiers 8 receive information from memory array 6 through cable 12 and from bit driver 7 through cable 12a. The operation of sense amplifiers 8 is controlled by control signals received from memory control 9 through cable 13.

Bidirectional latch unit 2 comprises a plurality of bidirectional latch circuits designated at 14, **14*a*, 14*b*, with one such circuit for each bit line of bidirectional data bus 3; that is, there will be one bidirectional latch circuit and one bit line for each of the bits of the word or other group of bits to be transmitted simultaneously in parallel. Bidirectional latch circuits 14, 14*a*, 14*b* are identical and the logic circuitry of only bidirectional latch circuit 14** is shown in the drawing and described below.

Bidirectional latch circuit 14 comprises a first NOR gate 15, a second NOR gate 16, an OR gate 17, an AND gate 18 and an INVERTER gate 19. Extending from memory control 9 is a data gate line 20 connected by respective leads 23, **23*a*, 23*b* to the inputs of the respective INVERTER gates 19 of bidirectional latch circuits 14, 14*a*, 14*b*. Data gate line 20 is also connected by a lead 21 to an input 22 of NOR gate 15 of each of the latch circuits. The output of NOR gate 15 is connected by a lead 24 to an imput 25 of NOR gate 16 and to an input 26 of OR gate 17**.

Extending from the outputs of sense amplifiers 8 is a cable 27 comprising a plurality of leads 28, **28*a*, 28*b* each extending to the other input 29 of NOR gate 16 of the respective latch circuits 14, 14*a*, 14*b*. Each of the leads 28, 28*a*, 28*b*** is also connected to the other input 30 of the respective OR gate 17. The output of the latter is connected to one input 31 of AND gate 18 and the output of INVERTER gate 19 is connected to the other input 32 of AND gate 18. The output of NOR gate 16 is connected by a lead 33 to the other input 34 of NOR gate 15. The outputs of the respective AND gates 18 of bidirectional latch circuits 14, 14*a*, 14*b* are connected by respective leads 35, 35*a*, 35*b* to nodes 36, 36*a*, 36*b*.

Bidirectional data bus 3 comprises a plurality of data bus lines 37, 37*a*, 37*b* connected respectively to nodes 36, 36*a*, 36*b*. Also connected to the latter are a plurality of lines 38, 38*a*, 38*b* constituting a cable 39 extending to buffer 5 from which extends a cable 39′ going to bit drivers 7. The end 40 of cable 39′ is in effect at the input of memory unit 1, and the end 41 of cable 27 is in effect at the output of memory unit 1. The end 42 of cable 39 may be regarded as at an output of bidirectional latch unit 2. The latter is also provided with a combined input-output at the left-hand end 43 of bidirectional data bus 3. The right-hand end 44 of the latter may be regarded as at the combined input-output of central processing unit 4. Buffer 5 comprises a plurality of non-inverting amplifiers 45, 45*a*, 45*b* each amplifying the signal of a respective one of the lines constituting cable 39.

READ 1 Operation

The READ 1 operation will now be described. When the particular memory cell being addressed in memory array 6 stores a 1 bit, the respective sense amplifier of the set 8 senses this logic state of the memory cell and generates a 1 on line 28 and hence at input 29 of NOR gate 16 and input 30 of OR gate 17. Hence, line 33 extending from the output of NOR gate 16 is at the 0 level and line 31 extending from OR gate 17 is at the 1 level. Data gate line 20 is initially at the 1 level so that the output of NOR gate 15 and hence also the input 25 of NOR gate 16 and the input 26 of OR gate 17 are at the 0 level. Data gate line 20 then goes to the 0 level, thereby applying a 0 signal to the input 22 of NOR gate 15 so as to activate the output of the latter to the 1 level. This causes input 25 of NOR gate 16 and input 26 of OR gate 17 to rise to the 1 level. The 0 signal transmitted by line 23 to the input of inverter gate 19 appears at the output of the latter and hence at the input 32 of AND gate 18 as a 1 signal, thereby activating AND gate 18 so that its output 35 rises to the 1 level.

Now let it be assumed that the signal on line 28 from the output of a sense amplifier 8 drops down to the 0 level. This will have no effect on the logic level appearing at line 35 extending from the output of AND gate 18, and the signal level at lines 35, 37 will remain at the 1 level for eventual transmission by the bidirectional data bus 3 to central processing unit 4 while memory unit 1 is released for other operations. More specifically, if the signal at line 28 drops to the 0 level, NOR gate 16 is not affected and remains latched in its previous state because its input 25 is at the 1 leve. Similarly, OR gate 17 is not affected and its output 31 remains at the 1 level because its input 26 is latched at the 1 level by NOR gate 15. Therefore AND gate 18 remains activated and its output together with lines 35, 37 remain at the 1 level notwithstanding the drop of the signal at line 28 from sense amplifiers 8 to the 0 level. Therefore memory unit 1 is now free to perform other operations while bidirectional latch unit 2 maintains the 1 signal on the appropriate data bus line 37 of bidirectional data bus 3 for as long as required for central processing unit 4 to accept this bit of information. That is, the 1 signal will remain on data bus line 37 until the signal at data gate line 20 returns to the 1 level to complete the cycle of operation. Before this occurs, the released memory unit 1 may have performed a number of other operations. By thus releasing memory unit 1 from the job of maintaining the data integrity of bidirectional data bus 3 during the READ operation, the speed of operation of memory unit 1 is substantially improved.

READ 0 Operation

The READ 0 operation will now be described. The respective one of sense amplifiers 8 senses a 0 bit in the addressed memory cell of memory array 6 and transmits this 0 signal to line 28 and hence to input 29 of NOR gate 16 and input 30 of OR gate 17. Data gate line 20 is initially at the 1 level so that this level appears at the input 22 of NOR gate 15. As a result, a 1 signal appears at the output of NOR gate 16 and at the input 34 of NOR gate 15. The signal on data gate line 20 then drops to the 0 level so as to transmit the signal along line 23 to the input of INVERTER gate 19 and along line 21 to the input 22 of NOR gate 15. Since both inputs 26 and 30 of OR gate 17 are at the 0 level, the output of OR gate 17 and hence the output of AND gate 18 are at the 0 level, which signal is also transmitted through lead 35 to the respective data bus line 37 of bidirectional data bus 3.

It is not necessary to latch the 0 bit in either the READ 0 or WRITE 0 operations. This is because in the preferred embodiment the 0 state is the normal level of both bidirectional data bus 3 and the output leads 28, 28*a*, 28*b* extending from sense amplifiers 8, as well as the other units of the system. When memory unit 1 is released during a READ 0 operation and goes on to other operations, lead 28 is maintained at the 0 level until the arrival of a 1 bit in a later cycle. Similarly, when central processing unit 4 is released during a WRITE 0 operation and goes on to other operations, bidirectional data bus line 37 is maintained at the 0 level by the central processing unit until the arrival of a 1 bit in a later cycle. However, it will be obvious to those skilled in the art that latch unit 2 may be readily modified so that the 0 bit is latched in the same manner as the 1 bit if so desired.

WRITE 1 Operation

The WRITE 1 operation will now be described. Central processing unit 4 transmits a 1 bit of information along data bus line 37 of bidirectional data bus 3 to node 36 from where the bit is transmitted by line 38 of cable 39 to the respective non-inverting amplifier 45 of buffer 5. The amplified signal is then transmitted by cable 39′ to the respective one of bit drivers 7 and then through one of the leads of cable 12*a* to a respective one of sense amplifiers 8 from which the bit of information is transmitted by lead 28 to the input 29 or NOR gate 16 and the input 30 of OR gate 17. The 1 bit is then latched in bidirectional latch circuit 14 in the same manner as described above with respect to the READ 1 operation so that central processing unit 4 is no longer required to maintain the data integrity of bidirectional data bus 3 and central processing unit 4 is thereby released for other operations. The 1 bit remains latched in bidirectional latch circuit 14 until data gate line 20 returns to the 1 level to complete the cycle.

WRITE 0 Operation

The WRITE 0 operation will now be described. Central processing unit 4 transmits a 0 bit of information along data bus line 37 of bidirectional data bus 3 to node 36 from which the bit of information is transmitted by line 38 of cable 39 to the respective noninverting amplifier 45 of buffer 5 and then through cable 39' to the respective one of bit drivers 7. From the latter the bit of information is transmitted through one of the leads of cable 12*a* to a respective one of sense amplifiers 8 and then to lead 28 extending from the sense amplifier. The 0 bit then appears at lead 35 extending from the output of AND gate 18 in the same manner as described above with respect to the READ 0 operation. The 0 bit is also transmitted by a respective one of bit drivers 7 through one of leads 10 to the addressed memory cell in memory array 6 where the bit is stored.

Error Checking Feature

It will be noted in the above description that during the WRITE operations the bit transmitted by central processing unit 4 and stored in memory unit 1 also appears at the output line 35 extending from AND gate 18. The bit may then be transmitted back along bidirectional data bus 3 to central processing unit 4 so that the latter may check whether there are any errors in the information stored during the WRITE operation.

It is to be understood that the specific embodiment shown in the drawings and described above is merely illustrative of one of the many forms which the invention may take in practice and that numerous variations and modifications thereof will readily occur to those skilled in the art without departing from the scope of the invention as delineated in the appended claims and that the claims are to be construed as broadly as permitted by the prior art.

We claim:

1. A digital computer memory system for use with a central processing unit having combined input-output means, said memory system comprising a memory unit having a first input means for receiving digital information to be stored therein and a first output means for transmitting digital information already stored therein, a bidirectional latch unit having a second input means, a second output means, and a combined input-output means, a first transmitting means connecting said second output means of said bidirectional latch unit to said first input means of said memory unit for transmitting information thereto during a WRITE operation, a second transmitting means connecting said first output means of said memory unit to said second input means of said bidirectional latch unit for transmitting information stored in said memory unit to said bidirectional latch unit during a READ operation, and a bidirectional data bus interconnecting said combined input-output means of said bidirectional latch unit and said combined input-output means of said central processing unit for transmitting information between said bidirectional latch unit and said central processing unit in both directions, said bidirectional latch unit comprising means connecting said combined input-output means thereof to said second output means for transmitting information from said central processing unit to said memory unit for storage by the latter during a WRITE operation, said bidirectional latch unit comprising means for maintaining on the data bus after said WRITE operation the integrity of the information previously transmitted by said first transmitting means to said first input means of said memory unit during said WRITE operation, whereby the central processing unit may check said stored information for errors.

* * * * *